United States Patent
Fricke et al.

(10) Patent No.: US 7,249,578 B2
(45) Date of Patent: Jul. 31, 2007

(54) CYLINDER HEAD GASKET FOR USE IN AN INTERNAL COMBUSTION ENGINE AND INTERNAL COMBUSTION ENGINE EQUIPPED THEREWITH

(75) Inventors: Jan-Henrik Fricke, Sickte (DE);
Franz-Josef Bielefeld, Lehrte (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 11/263,204

(22) Filed: Oct. 31, 2005

(65) Prior Publication Data

US 2006/0090714 A1 May 4, 2006

(30) Foreign Application Priority Data

Oct. 30, 2004 (DE) .................. 10 2004 052 788

(51) Int. Cl.
*F02F 11/00* (2006.01)
(52) U.S. Cl. .................. 123/41.74; 123/41.82 R; 277/591; 277/592
(58) Field of Classification Search .......... 123/41.74, 123/193.3, 41.82 R; 277/592, 591
See application file for complete search history.

(56) References Cited

U.S. PATENT DOCUMENTS

| | | | | |
|---|---|---|---|---|
| 1,932,539 A | * | 10/1933 | Victor | ................ 277/597 |
| 3,444,845 A | | 5/1969 | Scheiterlein | |
| 3,759,233 A | * | 9/1973 | Schlaffer et al. | ........... 123/41.1 |
| 4,312,512 A | * | 1/1982 | Conte et al. | ................ 277/593 |
| 4,365,593 A | | 12/1982 | Pomfret | |
| 4,976,225 A | * | 12/1990 | Stang et al. | ............. 123/41.74 |
| 5,031,579 A | * | 7/1991 | Evans | ...................... 123/41.2 |
| 5,374,069 A | * | 12/1994 | Pecina | ....................... 277/592 |
| 6,406,032 B1 | | 6/2002 | Miyaoh | |
| 6,530,348 B2 | * | 3/2003 | Laimbock | ................ 123/41.57 |
| 6,543,405 B2 | * | 4/2003 | Sachdev et al. | ......... 123/195 R |

FOREIGN PATENT DOCUMENTS

| | | |
|---|---|---|
| AT | 283824 | 8/1970 |
| EP | 0 833 088 A1 | 4/1998 |
| EP | 1 083 371 A2 | 3/2001 |
| EP | 1 217 268 A2 | 6/2002 |
| GB | 2 168 428 A | 6/1986 |
| WO | WO 03/093661 A1 * | 11/2003 |

* cited by examiner

*Primary Examiner*—Stephen K. Cronin
*Assistant Examiner*—Ka Chun Leung

(57) ABSTRACT

A combustion engine includes a cylinder head and a cylinder crankcase having a cylinder bore and a coolant duct formed therein. The coolant duct is disposed adjacent the cylinder bore and is a cooling system component. A cylinder head gasket is provided between the cylinder head and the cylinder crankcase. The coolant duct has a coolant duct upper end and is open toward the cylinder head gasket at the coolant duct upper end. The cylinder head gasket has a side facing the cylinder crankcase when the cylinder head gasket is installed. The cylinder head gasket has a channel formed on the side of the cylinder head gasket that faces the cylinder crankcase. The channel is in a flow connection with the coolant duct and is part of the cooling system.

6 Claims, 2 Drawing Sheets

CYLINDER HEAD GASKET FOR USE IN AN INTERNAL COMBUSTION ENGINE AND INTERNAL COMBUSTION ENGINE EQUIPPED THEREWITH

CROSS-REFERENCE TO RELATED APPLICATION

This application claims the priority, under 35 U.S.C. § 119, of German patent application No. 10 2004 052 788.1, filed Oct. 30, 2004; the entire disclosure of the prior application is herewith incorporated by reference.

BACKGROUND OF THE INVENTION

Field of the Invention

The invention relates to a cylinder head gasket and to an internal combustion engine using the cylinder head gasket.

Increasing requirements with regard to fuel consumption, exhaust gas emission and service life of an internal combustion engine necessitate an evermore efficient cooling, both of the cylinder crankcase and of the cylinder head. Since, however, both components reach their optimum operating range at different temperatures, particularly in the case of powerful internal combustion engines the cylinder head and the cylinder crankcase are increasingly cooled in separate coolant circuits. As a result, it is possible in the cylinder crankcase to set a high temperature which has a favorable effect on the wear of the cylinder liners and the fuel consumption. The cylinder head on the other hand, which is exposed to very high thermal loading, can be cooled more efficiently.

A disadvantage of forming the two coolant circuits separately is that the coolant ducts of the cylinder crankcase have to be configured such that they are closed towards the cylinder head. The coolant ducts may already be closed during the casting of the cylinder crankcase or else may be closed subsequently, for example by welding over the coolant duct openings or by a cylinder head gasket which is closed in the region of the coolant duct opening. If the wall is already manufactured during casting, the cylinder crankcase inevitably has an unfavorable geometry for the casting manufacturing process, and so its production is very complicated and expensive. A closing of the coolant duct openings that takes place after casting, for example through the use of welding, is likewise very complicated and at best only practical in the case of very large motors which are produced only in small numbers. The closing of the coolant duct openings with cylinder head gaskets which are closed in the region of the openings is better suited for series manufacturing.

However, a common feature of all of the embodiments of a closed-deck variant of the cylinder crankcase is that gases released in the coolant accumulate directly under the closed upper ends of the coolant ducts. This results after some time in an air cushion in the upper region of the cylinder crankcase thus making it no longer possible for coolant to flow through this region. Very hot points arise which may result in cracking and distortion.

Austrian patent specification AT 283824 discloses an internal combustion engine which has a separate cooling water supply for the cylinder block and a separate cooling water supply for the cylinder head. The production of a cylinder block of this type with upwardly closed coolant ducts proves very complex because of the unfavorable geometry for casting. In spite of the high manufacturing outlay, strict limits are imposed on the configuration of the coolant ducts, as a result of which a compromise always has to be found between manufacturing costs and desired technical properties of the cylinder block. In addition, in the case of the cylinder block disclosed in this document, there is the risk that the gases released in the coolant will accumulate at the geodetically highest point in the coolant duct and will prevent coolant from flowing there, so that extremely hot regions arise which may result in damage to the cylinder block.

It should basically be noted that in many cases the freedom for positioning coolant ducts solely in the cylinder crankcase is impaired because of the geometrical conditions in the latter and because of manufacturing problems. This problem exists particularly for the production of coolant ducts which run transversely, as may be required, for example, for connecting individual cylinder coolant ducts. In particular, the connection of a common venting element comes to mind in this case.

SUMMARY OF THE INVENTION

It is accordingly an object of the invention to provide an internal combustion engine which overcomes the above-mentioned disadvantages of the heretofore-known internal combustion engines of this general type. It is specifically an object to provide, in a simple manner, a greater degree of freedom in the configuration of the cooling system in the cylinder crankcase of an internal combustion engine. In particular it is an object of the invention to provide a gasket configuration that overcomes the above-mentioned disadvantages of the prior art.

With the foregoing and other objects in view there is provided, in accordance with the invention, in a combustion engine with a cylinder head and with a cylinder crankcase having a cylinder bore and a coolant duct formed therein, the coolant duct being disposed adjacent the cylinder bore and being a cooling system component, a gasket configuration, including:

a cylinder head gasket to be provided between the cylinder head and the cylinder crankcase, the coolant duct having a coolant duct upper end and being open toward the cylinder head gasket at the coolant duct upper end;

the cylinder head gasket having a side facing the cylinder crankcase when the cylinder head gasket is in an installed state; and the cylinder head gasket having a channel formed on the side of the cylinder head gasket facing the cylinder crankcase, the channel being in a flow connection with the coolant duct and being a cooling system component.

In other words, according to the invention, there is provided a cylinder head gasket to be used in an internal combustion engine between a cylinder head and a cylinder crankcase which has, in the vicinity of the cylinder, at least one coolant duct as part of a cooling system. When the cylinder head gasket is installed, the coolant duct is open at an upper end toward the cylinder head gasket. The cylinder head gasket has, on its side facing the cylinder crankcase, at least one channel which is in flow connection with the at least one coolant duct and forms part of the cooling system.

According to another feature of the invention, the channel connects the coolant duct to a common venting element.

According to yet another feature of the invention, the common venting element is a gas-coolant separator, for example a coolant expansion tank.

According to a further feature of the invention, the cylinder crankcase has a cylinder liner, the cylinder liner has a given contour, the channel follows the given contour of the cylinder liner.

According to another feature of the invention, the cylinder head gasket has a wall thickness and has a given region with a reduced wall thickness, the given region with the reduced wall thickness forms the channel.

According to a further feature of the invention, the cylinder head gasket has layers including a layer facing the cylinder crankcase, the layer facing the cylinder crankcase has an opening formed therein for forming the channel.

According to another feature of the invention, the channel extends such that the channel is interrupted at the coolant duct.

With the objects of the invention in view there is also provided, a combustion engine, including:

a cylinder head;

a cylinder crankcase having a cylinder bore and a coolant duct formed therein, the coolant duct being disposed adjacent the cylinder bore and being a cooling system component;

a cylinder head gasket disposed between the cylinder head and the cylinder crankcase, the coolant duct having a coolant duct upper end and being open toward the cylinder head gasket at the coolant duct upper end;

the cylinder head gasket having a side facing the cylinder crankcase; and the cylinder head gasket having a channel formed on the side of the cylinder head gasket facing the cylinder crankcase, the channel being in a flow connection with the coolant duct and being a cooling system component.

In other words, according to the invention, there is provided, an internal combustion engine having a cylinder head gasket between a cylinder head and a cylinder crankcase which has, in the vicinity of the cylinder, at least one coolant duct as part of a cooling system, which coolant duct is open at an upper end toward the cylinder head gasket, wherein the cylinder head gasket has on the side which faces the cylinder crankcase at least one channel which is in flow connection with the at least one coolant duct and forms part of the cooling system.

The integration according to the invention of the cylinder head gasket in the cooling system namely by a duct of the cooling system being formed by the channel or groove advantageously results, with minimal outlay, in a greater degree of freedom in the accommodating of coolant ducts than in the prior art.

In the case of a cylinder head gasket of the above-mentioned type, the invention makes provision for the cylinder head gasket to have on its side which, in the fitted state, faces the cylinder crankcase at least one channel which is in flow connection with the at least one coolant duct and forms part of the cooling system. The channel may constitute a flow connection between a plurality of coolant ducts which are assigned to different cylinders.

The channel or groove which is incorporated into the cylinder head gasket is located at the geodetically highest point of the coolant ducts in the cylinder crankcase and so the gases that have penetrated or seeped into the coolant collect there. The connection of the channel to a venting element allows the gases to be subsequently carried together with a small amount of coolant into the venting element. In the venting element, the gases can subsequently escape and the coolant is again available to the coolant circuit. This avoids gases accumulating in the upper region of the cylinder crankcase, which gases would inevitably result, due to reduced coolant circulation, in extremely hot points and would promote cracking and distortion.

In a preferred embodiment, the channel brings the at least one coolant duct into connection with a common venting element. This makes it possible for the gas accumulating in the channel to migrate due to the flow which arises because of the connection of the coolant ducts slowly in the direction of the venting element and to escape there from the coolant duct.

Since in general the coolant ducts are located very close to the cylinder bores and nest against the contour of the cylinder bores, the channel which is built into the cylinder head gasket also follows the course of the contour of the cylinder bores in the cylinder crankcase when the cylinder head gasket is in its installed state. This has the advantage that what are referred to as creeping gases which are pressed under the cylinder head gasket by the combustion pressure are collected in the channel and do not search for a route into the coolant or into the open air.

The channel is preferably obtained by a local reduction in the wall thickness of the cylinder head gasket. This can be brought about by many different methods, however it preferred, in the case of a cylinder head gasket which includes a plurality of individual layers, that only the layer which faces the cylinder block has at least one recess for forming the channel. This recess may already be taken into consideration during the manufacturing of the individual layer or else may be formed subsequently, for example by punching it out.

Particularly in the case of a multi-layered construction of the cylinder head gasket, it is advantageous if the channel is interrupted in the region of the coolant ducts. This facilitates the handling of the layer during the production thereof.

The venting element to which the channel is connected preferably constitutes a gas-coolant separator, for example in a coolant expansion tank. The latter is preferably located outside the cylinder crankcase at a geodetically higher point than the at least one channel.

Other features which are considered as characteristic for the invention are set forth in the appended claims.

Although the invention is illustrated and described herein as embodied in a cylinder head gasket for use in an internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
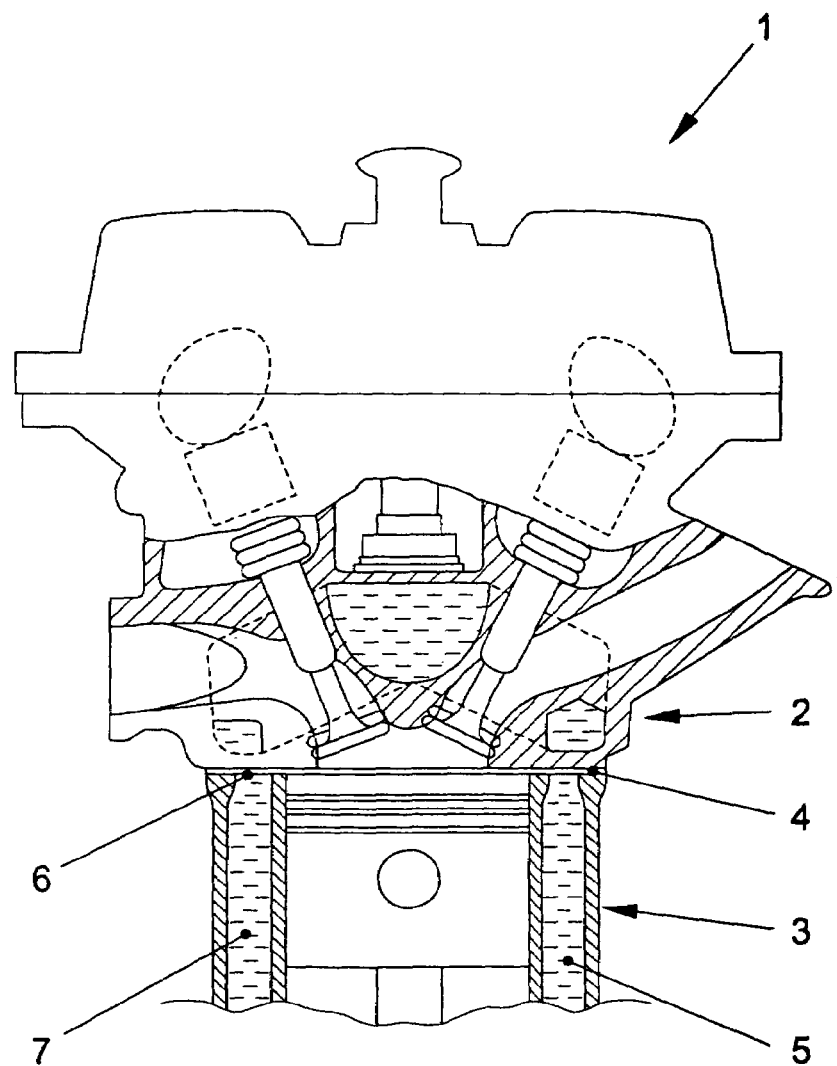
FIG. 1 is a diagrammatic sectional view of the cylinder crankcase and the cylinder head of an internal combustion engine, in each case with coolant ducts in accordance with the invention.

Referring now to the figures of the drawings in detail and first, particularly, to FIG. 1 thereof, there is shown an internal combustion engine 1, partially in a sectional view, which illustrates the individual coolant circuits of the cylinder head 2 and the cylinder block and crankcase or cylinder crankcase 3. A cylinder head gasket 4 which separates the two coolant circuits from each other is shown between the cylinder head 2 and the cylinder crankcase 3. The coolant ducts 5 in the cylinder crankcase 3 are open upward toward the cylinder head gasket 4. The cylinder head gasket 4 is closed in the region of the openings 6 of the coolant ducts 5, and so the coolant liquid 7 cannot enter into the cylinder head 2.

The gases accumulating in the coolant liquid 7 at the geodetically highest point of the coolant ducts 5 are conducted away by channels or grooves 8 which are incorporated into the cylinder head gasket 4. These channels 8 therefore connect the coolant ducts 5 which are assigned to the various cylinder liners 8 and, as a result of being accommodated in the cylinder head gasket 4, the channels 8 can be produced in a simple manner and their course or pattern is independent of constraints or conditions related to the casting of the crankcase 3.

Figure 2:
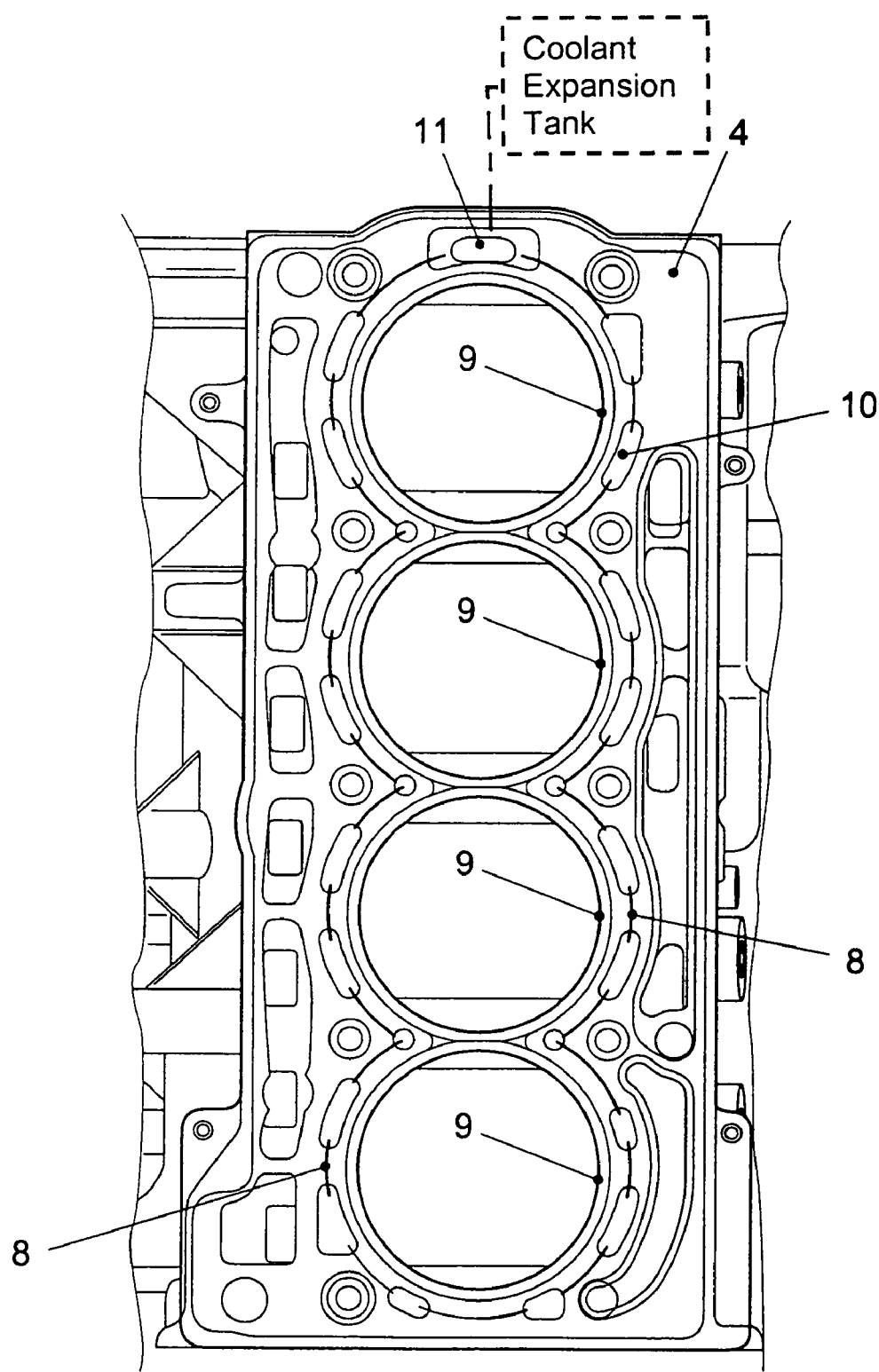
FIG. 2 is a diagrammatic plan view of an embodiment of the cylinder head gasket according to the invention.

FIG. 2 shows the placement of the channels 8 in the cylinder head gasket 4. Since the channels 8 connect those regions 10 of the cylinder head gasket 4 which come into contact with the coolant liquid 7 to one another, the channels 8 are part of a closed coolant circuit which leads into a venting element 11 which, in this exemplary embodiment, is connected to a coolant expansion tank which is only schematically indicated. The channels 8 nest against i.e. follow the contour of the cylinder liners 9 and, as a result, also pick up what are referred to as creeping gases which can be pressed through to a small extent under the cylinder head gasket 4 during the combustion operation. The channels 8 are advantageously interrupted in the regions 10, as a result of which the manufacturing of the cylinder head gasket 4 is facilitated.

Figure 3:
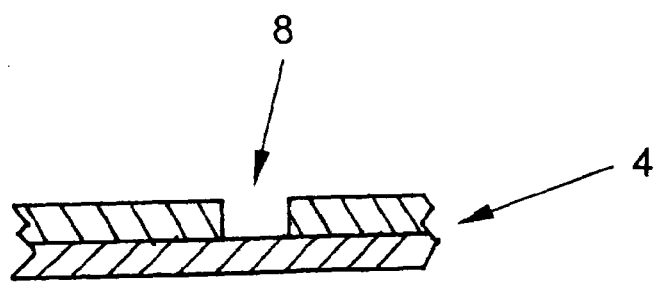
FIG. 3 is a schematic partial sectional view of a multi-layered cylinder head gasket according to the invention.

FIG. 3 is a schematic partial sectional view of a multi-layered cylinder head gasket 4 according to the invention. The channel 8 is obtained by providing a recess or opening 8 only in the layer which faces the cylinder crankcase 3. This recess or opening can be formed when manufacturing the individual layer or else may be formed subsequently, for example by punching out openings 8 in the layer facing the cylinder crankcase 3.

The invention thus provides a solution to the above-mentioned object wherein the solution according to the invention, despite its simplicity, satisfies all requirements with regard to a simple manufacturing and reliability during operation.

We claim:

1. In a combustion engine with a cylinder head and with a cylinder crankcase having a cylinder bore and a coolant duct formed therein, the coolant duct being disposed adjacent the cylinder bore and being a cooling system component, a gasket configuration, comprising:
    a cylinder head gasket to be provided between the cylinder head and the cylinder crankcase, the coolant duct having a coolant duct upper end and being open toward said cylinder head gasket at said coolant duct upper end;
    said cylinder head gasket having a side facing the cylinder crankcase when said cylinder head gasket is in an installed state; and
    said cylinder head gasket having a channel formed on said side of said cylinder head gasket facing the cylinder crankcase, said channel being in a flow connection with the coolant duct, being interrupted at the coolant duct, and being a cooling system component.

2. The gasket configuration according to claim 1, connected to a common venting element, said channel connecting the coolant duct to said common venting element.

3. The gasket configuration according to claim 1, wherein the cylinder crankcase has a cylinder liner, the cylinder liner has a given contour, said channel follows said given contour of said cylinder liner.

4. The gasket configuration according to claim 1, wherein said cylinder head gasket has a wall thickness and has a given region with a reduced wall thickness, said given region with said reduced wall thickness forms said channel.

5. The gasket configuration according to claim 1, wherein said cylinder head gasket has layers including a layer facing the cylinder crankcase, said layer facing the cylinder crankcase has an opening formed therein for forming said channel.

6. A combustion engine, comprising:
    a cylinder head;
    a cylinder crankcase having a cylinder bore and a coolant duct formed therein, said coolant duct being disposed adjacent said cylinder bore and being a cooling system component;
    a cylinder head gasket disposed between said cylinder head and said cylinder crankcase, said coolant duct having a coolant duct upper end and being open toward said cylinder head gasket at said coolant duct upper end;
    said cylinder head gasket having a side facing said cylinder crankcase; and
    said cylinder head gasket having a channel formed on said side of said cylinder head gasket facing said cylinder crankcase, said channel being in a flow connection with said coolant duct, being interrupted at said coolant duct, and being a cooling system component.

* * * * *